(12) United States Patent
Taniyama et al.

(10) Patent No.: US 8,117,501 B2
(45) Date of Patent: Feb. 14, 2012

(54) VIRTUAL LIBRARY APPARATUS AND METHOD FOR DIAGNOSING PHYSICAL DRIVE

(75) Inventors: Yukio Taniyama, Kawasaki (JP); Yasuhiko Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 12/691,729

(22) Filed: Jan. 21, 2010

(65) Prior Publication Data
US 2010/0192019 A1 Jul. 29, 2010

(30) Foreign Application Priority Data
Jan. 23, 2009 (JP) .................................. 2009-012470

(51) Int. Cl.
*G06F 11/00* (2006.01)
(52) U.S. Cl. ...................................... 714/42; 369/53.13
(58) Field of Classification Search .......................... None
See application file for complete search history.

(56) References Cited

U.S. PATENT DOCUMENTS

| 5,812,761 | A | | 9/1998 | Seki et al. | |
|---|---|---|---|---|---|
| 6,023,709 | A | * | 2/2000 | Anglin et al. | ............ 1/1 |
| 6,377,959 | B1 | | 4/2002 | Carlson | |
| 6,842,841 | B1 | | 1/2005 | Kuik | |
| 7,340,642 | B1 | * | 3/2008 | Coatney | .............. 714/5.1 |
| 7,685,463 | B1 | * | 3/2010 | Linnell | .............. 714/5.1 |
| 2002/0006004 | A1 | * | 1/2002 | Miyamura | ............... 360/53 |
| 2005/0013035 | A1 | * | 1/2005 | Crighton et al. | ............... 360/69 |
| 2006/0224827 | A1 | * | 10/2006 | Hirofuji et al. | ................ 711/114 |
| 2006/0271818 | A1 | * | 11/2006 | Chien | ............... 714/13 |
| 2008/0031111 | A1 | * | 2/2008 | Hwang et al. | ............. 369/53.16 |
| 2008/0198489 | A1 | * | 8/2008 | Ballard et al. | ................. 360/31 |
| 2010/0182887 | A1 | * | 7/2010 | Moody et al. | ............. 369/53.42 |
| 2011/0107140 | A1 | * | 5/2011 | Bish et al. | ...................... 714/6.2 |

FOREIGN PATENT DOCUMENTS

| JP | 1-318113 A | 12/1989 |
|---|---|---|
| JP | 07-262068 | 10/1995 |
| JP | 09-167427 | 6/1997 |
| JP | 2003-510679 A | 3/2003 |
| JP | 2004-038380 | 2/2004 |
| JP | 2008-134682 | 6/2008 |
| JP | 2008-276804 | 11/2008 |
| WO | WO-01-22210 | 3/2001 |

* cited by examiner

*Primary Examiner* — Gabriel Chu
(74) *Attorney, Agent, or Firm* — Fujitsu Patent Center

(57) ABSTRACT

A virtual library apparatus includes an exclusive control section that exclusively secures a logical drive and a physical drive according to an instruction from a host at a time of an occurrence of an error in the physical drive and a diagnostic section that performs a diagnostic process on the exclusively secured physical drive through the exclusively secured logical drive. The exclusive control section releases the exclusively secured logical and physical drives after the diagnostic section completes the diagnostic process for the physical drive.

8 Claims, 7 Drawing Sheets

FIG. 2

| LOGICAL DRIVE | PHYSICAL DRIVE | STATE |
|---|---|---|
| #1 | #10 | IN USE |
| #2 | #14 | IN USE |
| #3 | #20 | AVAILABLE |
| ... | ... | AVAILABLE |

| TIME | PHYSICAL DRIVE | MEDIUM |
|---|---|---|
| AAA | #10 | 1 |
| BBB | #11 | 1 |
| CCC | #12 | 1 |
| ... | ... | ... |

27

VIRTUAL LIBRARY APPARATUS AND METHOD FOR DIAGNOSING PHYSICAL DRIVE

CROSS-REFERENCE TO RELATED APPLICATIONS

This application is based upon and claims the benefit of priority of the prior Japanese Patent Application No. 2009-12470, filed on Jan. 23, 2009, the entire contents of which are incorporated herein by reference.

FIELD

Embodiments discussed herein relate to a virtual library apparatus and a method for diagnosing a physical drive.

BACKGROUND

FIG. 7 illustrates an exemplary configuration of a virtual library apparatus in a related art. When a data Write request is issued from a host 10 to a hierarchical control server 111 included in the virtual library apparatus 11, the hierarchical control server 111 causes a plurality of logical drives 200 included in a disk array device 112 in the virtual library apparatus 11 to execute the data Write. The logical drives 200 write the data into a logical volume. The hierarchical control server 111 then saves the data written in the abovementioned logical volume in the background, without using the host 10, into a physical tape (medium) loaded into physical drives 123 in a tape library 12 (migration process). Specifically, the hierarchical control server 111 instructs a drive control section 121 included in the tape library 12 to write the data into a physical tape loaded into one of the physical drives 123. Note that a robot 122 is a device to convey and load the physical tape into a physical drive 123.

When an error (for example, a fault) occurs in a physical drive 123 in the background, the hierarchical control server 111 makes the physical drive 123 offline to be disconnected so that the physical drive 123 may not be used by the hierarchical control server. While maintenance operations of the physical drive 123 (head cleaning, faulty part replacement and the like) are performed, the physical drive 123 is prevented from being accessed. After the head cleaning, part replacement operation and the like are performed, the physical drive alone undergoes a diagnostic test offline. After completion of the diagnostic test, the physical drive is made online.

Note that a method for dynamically selecting a plurality of tape drives has been suggested in order to connect a plurality of hosts to a data storage system.

The virtual library apparatus in FIG. 7 makes the physical drive offline to be disconnected and then performs the diagnostic test on the physical drive. Therefore, for example, when a fault occurs on a part between the hierarchical control server 111 and the drive control section 121 in the tape library 12 (such as a cable, driver, and receiver), the physical drive 123 cannot be diagnosed online even if the physical drive 123 is made online and tried to be diagnosed from the host 10 after the aforementioned diagnostic test. Furthermore, if a medium called killer medium which causes a fault in the physical drive exists, a plurality of the physical drives may fail. When many physical drives fail due to the killer medium, it takes time to repair the failed physical drives. Thus, the physical drives must be diagnosed online after the all physical drives involved in the killer medium are exclusively secured. Moreover, it is desired that a physical drive other than the physical drive which is being diagnosed online can be used to execute a general job.

SUMMARY

According to an aspect of the invention, a virtual library apparatus includes an exclusive control section that exclusively secures a logical drive and a physical drive according to an instruction from a host at a time of an occurrence of an error in the physical drive and a diagnostic section that performs a diagnostic process on the exclusively secured physical drive through the exclusively secured logical drive. The exclusive control section releases the exclusively secured logical and physical drives after the diagnostic section completes the diagnostic process for the physical drive.

It is to be understood that both the foregoing summarized description and the following detailed description are exemplary and explanatory and are not restrictive of the invention, as claimed.

BRIEF DESCRIPTION OF DRAWINGS

FIG. 2 illustrates an example of physical drive usage information in a physical drive usage information storage section;

FIG. 3 illustrates an example of history information in a history information storage section;

DESCRIPTION OF EMBODIMENTS

Figure 1:
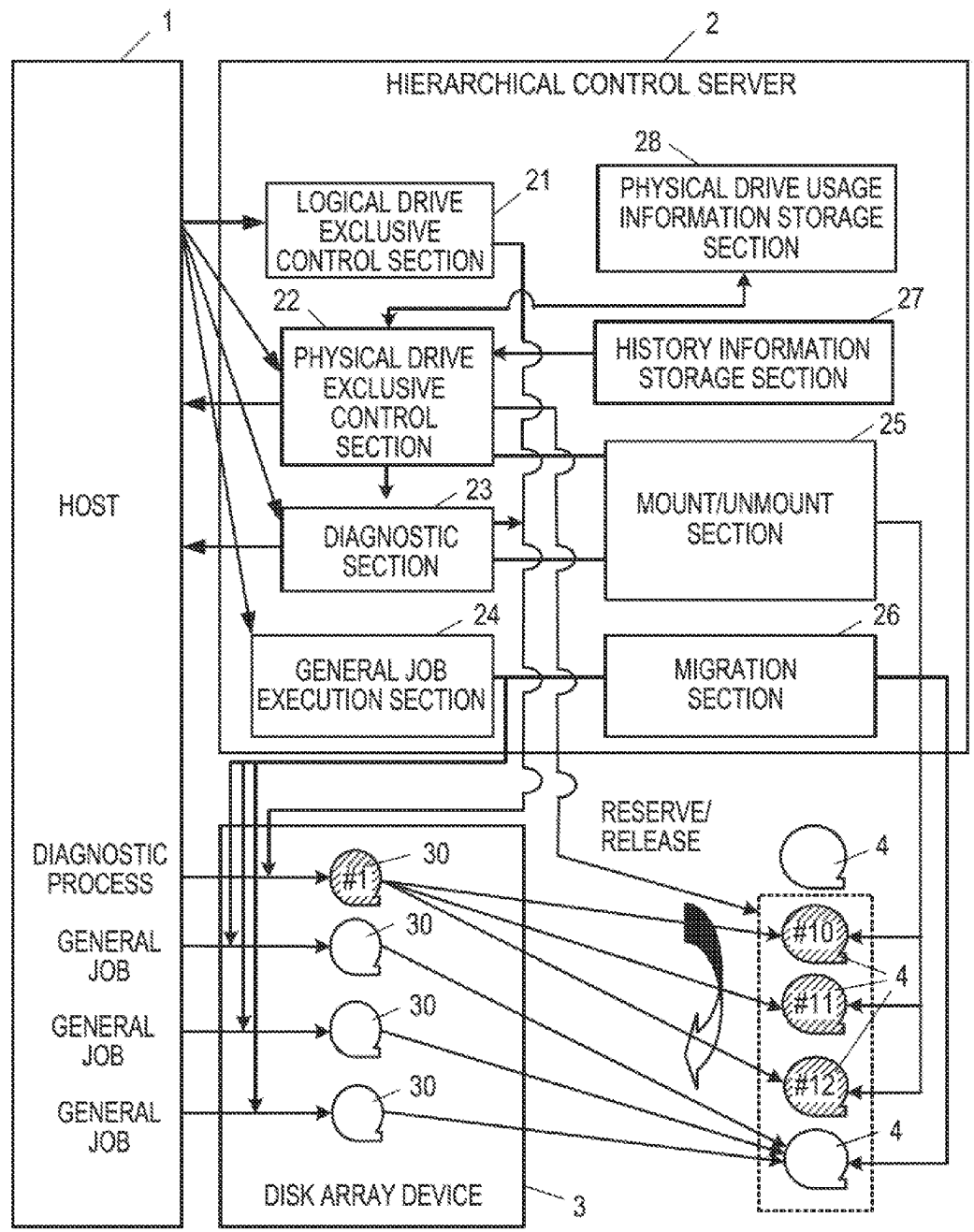
FIG. 1 illustrates an exemplary configuration of an embodiment.

FIG. 1 illustrates an exemplary configuration of an embodiment. A virtual library apparatus of this embodiment includes a hierarchical control server 2 and a disk array device 3. The virtual library apparatus causes one of the logical drives 30 and one of the physical drives 4 to execute a general job requested by a host computer 1 (hereinafter, referred to as a "host"). The virtual library apparatus also performs a diagnostic process described later on a physical drive 4 through a logical drive 30. Note that the physical drives 4 are provided in, for example, a tape library and have a function to access a physical volume (medium), such as a physical tape.

The host 1 instructs the hierarchical control server 2 via a network (not illustrated) to execute a general job, reserve a logical drive, reserve a physical drive, perform a diagnostic process on the physical drive, release the logical drive and release the physical drive. The instruction to execute a general job includes instructing the hierarchical control server 2 to execute a general job, such as Read or Write data. The instruction to reserve a logical drive includes instructing the hierarchical control server 2 to exclusively secure a logical drive 30 available (to not used the logical drive 30 for executing a job), specifically, to instruct to guard the logical drive 30 from receiving a general job (other than a job for the drive's diagnosis). The instruction to reserve a physical drive includes instructing the hierarchical control server 2 to exclusively secure a physical drive 4 having an error. More specifically, when an error occurs in a physical drive 4 that is executing a general job, a physical drive exclusive control section 22 described later included in the hierarchical control server 2 notifies the host 1 that the error has occurred, so that the host 1 instructs the hierarchical control server 2 to reserve a logical drive and the physical drive when receiving the notice of the occurrence of the error. Note that, when notifying the occurrence of the error, the physical drive exclusive control section 22 sends to the host 1 information required for the instruction to reserve the drives, such as identification information of the physical drive having the error.

The instruction to perform a diagnostic process on the physical drive includes instructing the hierarchical control server 2 to perform a diagnostic process on the abovementioned physical drive 4 exclusively secured. The diagnostic process for the physical drive 4 includes a process of diagnosing, for example, whether test data may be written into a medium for diagnosis loaded into the physical drive 4 or whether the test data may be read out from the medium for diagnosis. The instruction to release the logical drive includes instructing the hierarchical control server 2 to release the abovementioned logical drive exclusively secured. The instruction to release the physical drive includes instructing the hierarchical control server 2 to release the physical drive 4 in which the abovementioned diagnostic process is completed.

The hierarchical control server 2 receives from the host 1 an instruction to execute a general job and then executes the general job. For example, when receiving from the host 1 a data Read request from a logical volume or data Write request into a logical volume, the hierarchical control server 2 instructs a logical drive 30 in the disk array device 3 to execute the data read from the logical volume or the data write into the logical volume. After completion of the data write into the logical volume, the hierarchical control server 2 saves the written data into a medium loaded into the physical drive 4 (migration process).

Note that the hierarchical control server 2 uses the disk array device 3 as a cache to access the logical volume requested by the host 1. When the data requested by the host 1 is not held in the disk array device 3, the hierarchical control server 2 mounts a physical volume (medium) in which the requested data is stored to a physical drive 4 and reads out the data from the physical drive 4 to deploy the data in the disk array device 3.

When an error occurs in a physical drive, the hierarchical control server 2 notifies the host 1 of the occurrence of the error. The hierarchical control server 2 exclusively secures a logical drive 30 and the physical drive 4 according to the instruction from the host 1 that has received the notice of the occurrence of the error. The hierarchical control server 2 then performs a diagnostic process on the abovementioned physical drive 4 exclusively secured through the logical drive 30 exclusively secured.

The hierarchical control server 2 includes a logical drive exclusive control section 21, a physical drive exclusive control section 22, a diagnostic section 23, a general job execution section 24, a mount/dismount section 25, a migration section 26, a history information storage section 27, and a physical drive usage information storage section 28. The logical drive exclusive control section 21 receives from the host 1 the above described instruction to reserve a logical drive and then exclusively secures a logical drive 30 available (not used for executing a job). Specifically, the logical drive exclusive control section 21 sets a flag in a management table, the flag indicating in association with the logical drive 30 that the logical drive 30 is exclusively secured. The logical drive exclusive control section 21 also receives from the host 1 the above described instruction to release a logical drive and then releases the logical drive 30 exclusively secured. Specifically, the logical drive exclusive control section 21 resets or deletes the flag set in the abovementioned management table and associated with the logical drive 30 to be released.

The physical drive exclusive control section 22 detects the occurrence of an error in the physical drive 4 and then notifies the host 1 of the occurrence of the error. The physical drive exclusive control section 22 also receives the instruction from the host 1 to reserve the abovementioned physical drive having the error and then exclusively secures the physical drive 4. Specifically, the physical drive exclusive control section 22 sets a flag in a predetermined management table, the flag indicating in association with the physical drive 4 that the physical drive 4 is exclusively secured. In one embodiment, the physical drive exclusive control section 22 refers to physical drive usage information in the physical drive usage information storage section 28 described later to determine whether the abovementioned physical drive 4 to be exclusively secured is in use (used for executing a general job) or available. When the physical drive 4 is available, the physical drive exclusive control section 22 substantially prevents the physical drive 4 from receiving a general job and subsequently instructs the mount/dismount section 25 to mount (load) a medium for diagnosis to the physical drive 4. When the physical drive 4 to be exclusively secured is used for executing a general job, the physical drive exclusive control section 22 instructs the mount/dismount section 25 to dismount the medium loaded into the physical drive 4 in use from the physical drive 4. Then, the physical drive exclusive control section 22 substantially prevents the physical drive 4 from receiving a general job and subsequently instructs the mount/dismount section 25 to mount a medium for diagnosis to the physical drive 4. The physical drive exclusive control section 22 also receives from the host 1 the instruction to release the above described physical drive and then releases the physical drive in which the diagnostic process is completed. Specifically, the physical drive exclusive control section 22 resets the flag set in the management table and associated with the physical drive 4 to be released.

The logical drive exclusive control section 21 and the physical drive exclusive control section 22 described above have a function as an exclusive control section that exclusively secures a logical drive 30 and a physical drive 4, respectively, according to an instruction from the host 1 in the case of the occurrence of an error in the physical drive 4.

The diagnostic section 23 performs a diagnostic process (online diagnosis) on the exclusively secured physical drive 4 through the exclusively secured logical drive 30 according to the instruction from the host 1 to perform the diagnostic process on the physical drive. For example, when the exclusively secured logical drive 30 and physical drive 4 are the logical drive 30 shown as #1 and the physical drive 4 shown as #10 in FIG. 1, respectively, the diagnostic section 23 determines whether an abnormality is detected in the physical drive 4 #10 by the diagnostic process. When the diagnostic section 23 determines that the abnormality is detected in the physical drive 4 #10, the above-mentioned physical drive exclusive control section 22 refers to the history information in the history information storage section 27 and exclusively secures a new physical drive 4 (for example, the physical drive 4 shown as #11 in FIG. 1) that used a medium immediately before the physical drive 4 shown as #10 used the medium at the time of the occurrence of the error. The diagnostic section 23 then performs a diagnostic process on the new physical drive that is exclusively secured. Specifically, as the result of the diagnostic process, the physical drive exclusive control section 22 exclusively secures physical drives 4 sequentially until a physical drive 4 in which no abnormality is detected (for example, the physical drive 4 shown as #12 in FIG. 1) is found. This is done because the physical drive 4 in which an abnormality is detected is considered to have used a killer medium (a medium causes a fault in a physical drive 4) when the above described physical drive exclusive control section 22 detects the occurrence of the error, and so all the physical drives 4 that have used the killer medium are to be exclusively secured so as to be diagnosed. In other words, this is done to substantially prevent the killer medium from being used for a general job until all the physical drives 4 that have used the killer medium are completely diagnosed and the safety is confirmed. As the result of the diagnostic process, when no abnormality is detected in the physical drives 4, the diagnostic section 23 notifies the host 1 of the completion of the diagnostic process.

The general job execution section 24 receives from the host 1 an instruction to execute a general job and executes the general job. For example, the general job execution section 24 writes data into a logical drive 30. The mount/dismount section 25 receives an instruction from the physical drive exclusive control section 22 and performs an dismount process of a medium from a physical drive 4 and a mount process of a medium for diagnosis to a physical drive 4. The migration section 26, after data is written into the logical drive 30, saves the data in the medium mounted to the physical drive 4 available.

The history information storage section 27 stores history information. The history information includes at least a piece of information showing which physical drive has used which medium. The physical drive usage information storage section 28 stores physical drive usage information. The physical drive usage information is a piece of information showing whether the logical drive 30 and the physical drive 4 are in use (used for executing a general job) or available.

According to the virtual library apparatus of the embodiment described with reference to FIG. 1, after the logical drive 30 and the physical drive 4 are exclusively secured, the diagnostic process for the physical drive 4 may be performed online. Also, a general job may be executed using a physical drive 4 other than the physical drive 4 in the diagnostic process. In addition, all the physical drives 4 that have used a killer medium are exclusively secured and then the diagnostic process for the exclusively secured physical drives 4 may be performed.

FIG. 2 illustrates an example of physical drive usage information in the physical drive usage information storage section. The physical drive usage information has data items; a logical drive, a physical drive and a state. The logical drive data item represents the logical drives 30. The physical drive data item represents the physical drives 4 associated with the abovementioned logical drives 30. The physical drives 4 associated with the logical drives 30 are physical drives 4 executing a general job through the logical drives 30. The state data item represents whether each of the logical drives 30 and each of the physical drives 4 are in use or available for executing a general job. An "in use" represents that the drives are used for executing a general job, and an "available" represents that the drives are not used for executing a general job.

FIG. 3 illustrates an example of history information in the history information storage section. The history information has data items; a time, a physical drive, and a medium. The time data item represents a time when a physical drive 4 uses a medium, and the physical drive data item represents physical drives 4. The medium data item represents a medium used by the abovementioned physical drives.

Figure 4:
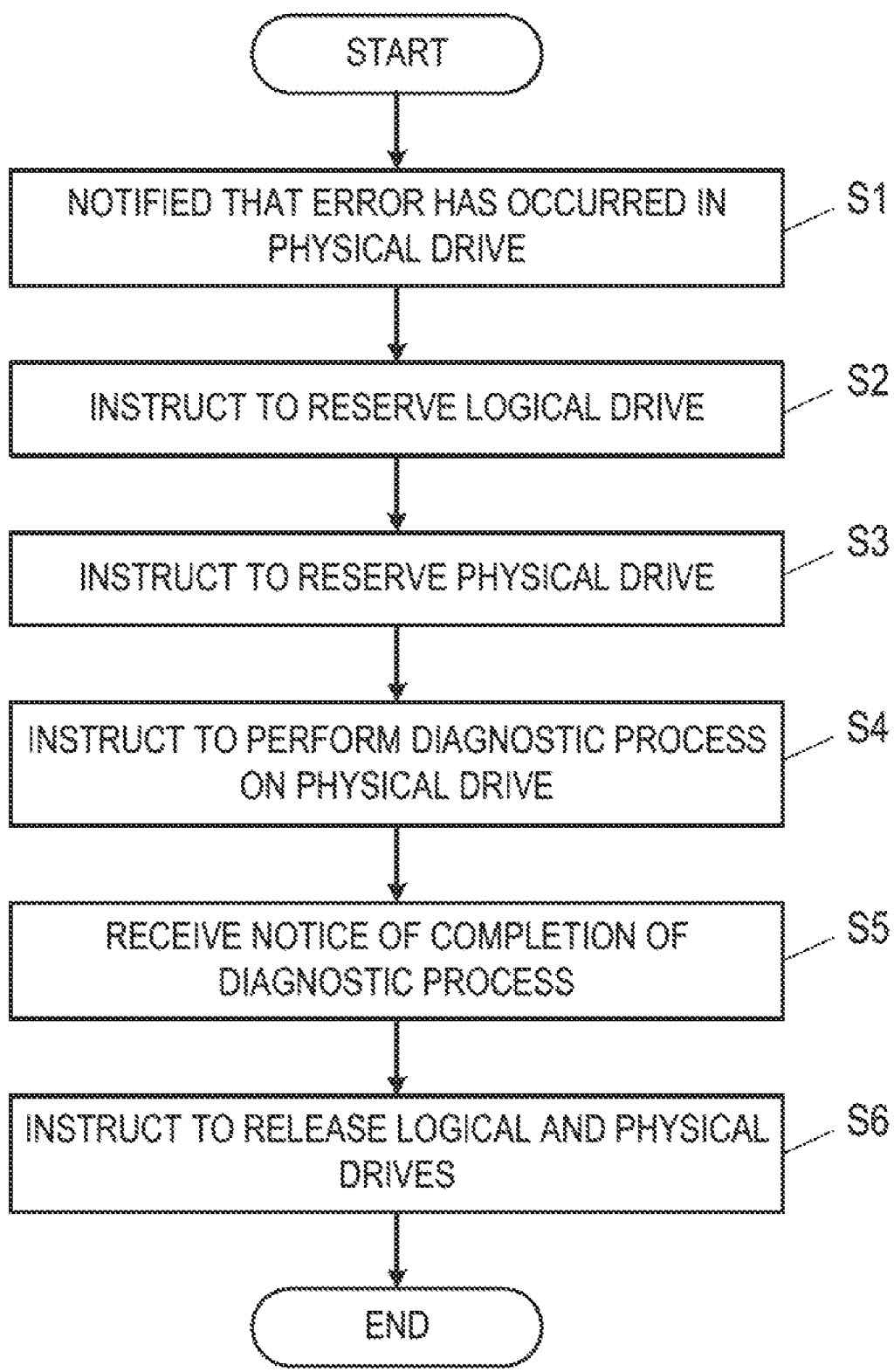
FIG. 4 illustrates an example of an operation process flow of a host.

FIG. 4 illustrates an example of an operation process flow of the host. When the host 1 is notified by the hierarchical control server 2 that an error has occurred in a physical drive 4 (at S1), the host 1 instructs the hierarchical control server 2 to reserve a logical drive (at S2). For example, to secure a logical drive X, the host 1 instructs to reserve the logical drive by issuing a command of "VARY RESERVE X". Next, the host 1 instructs the hierarchical control server 2 to reserve the physical drive (at S3), causing the hierarchical control server 2 to exclusively secure the physical drive 4 in which the abovementioned error has occurred. Subsequently, the host 1 instructs the hierarchical control server 2 to perform a diagnostic process on the physical drive (at S4). When the host 1 receives a notice from the hierarchical control server 2 that the diagnostic process is completed (at S5), the host 1 instructs the hierarchical control server 2 to release the logical drive and the physical drive (at S6).

Figure 5:
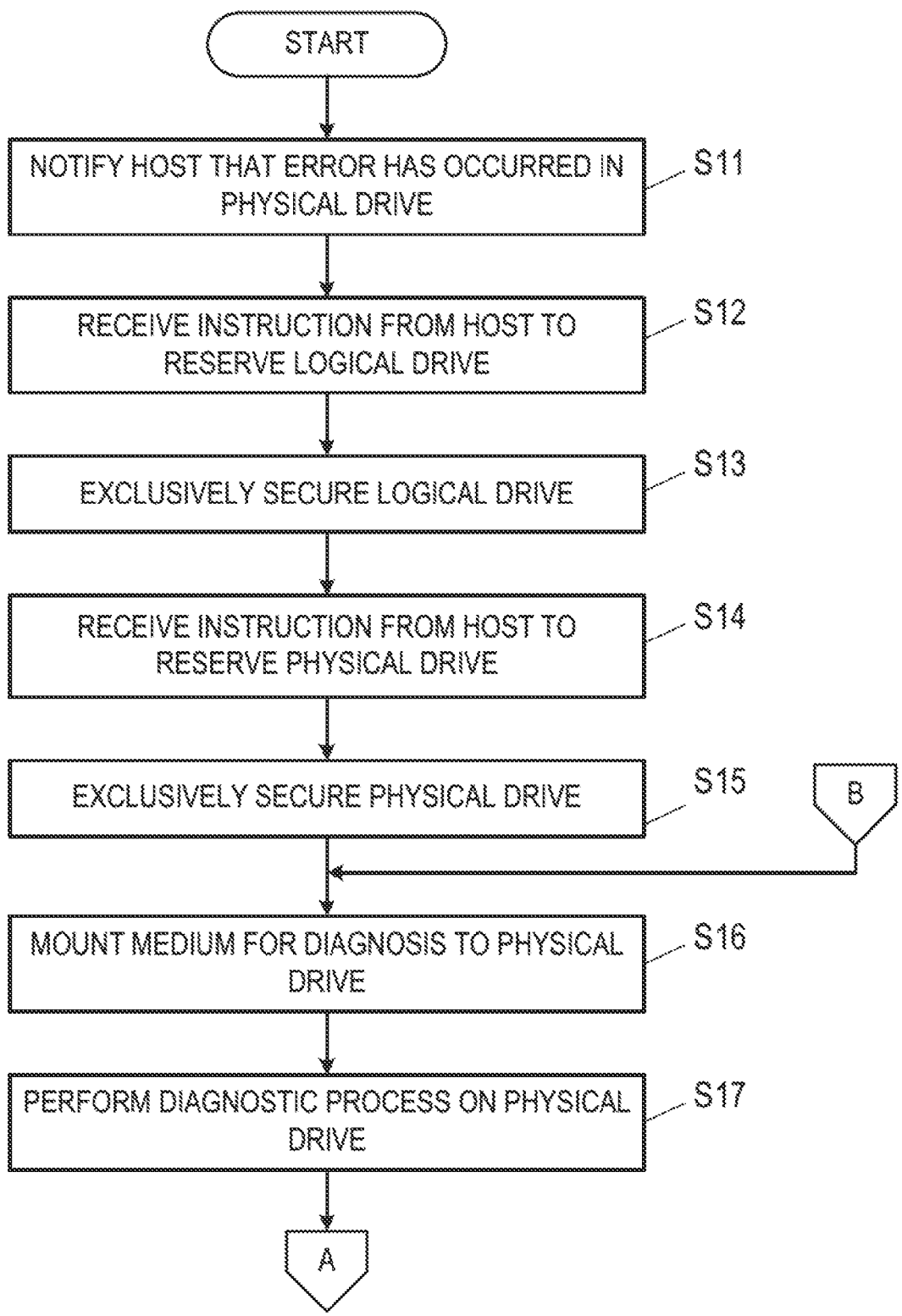
FIG. 5 illustrates an example of an operation process flow of a hierarchical control server.
Figure 6:
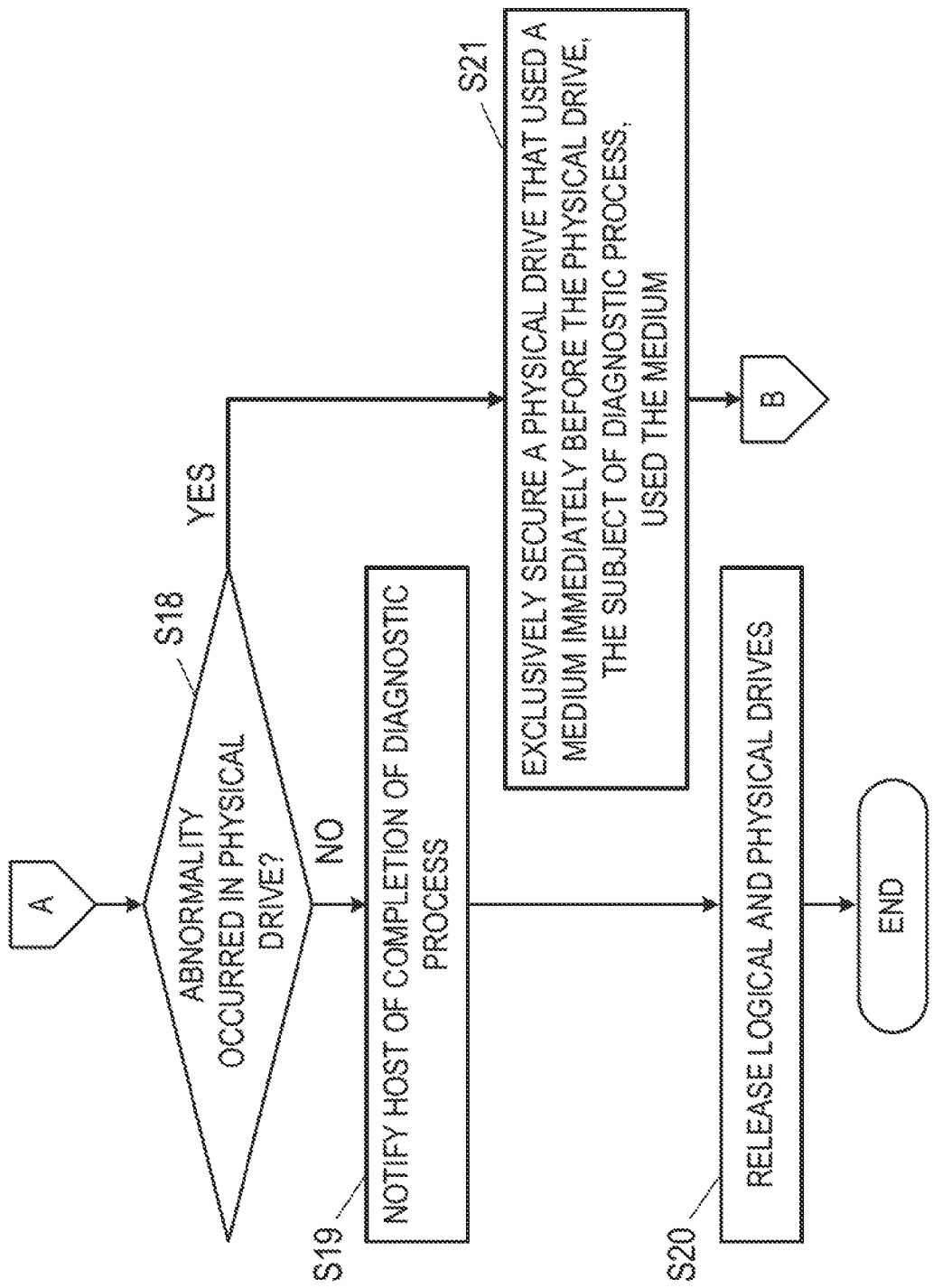
FIG. 6 illustrates an example of an operation process flow of the hierarchical control server.
Figure 7:
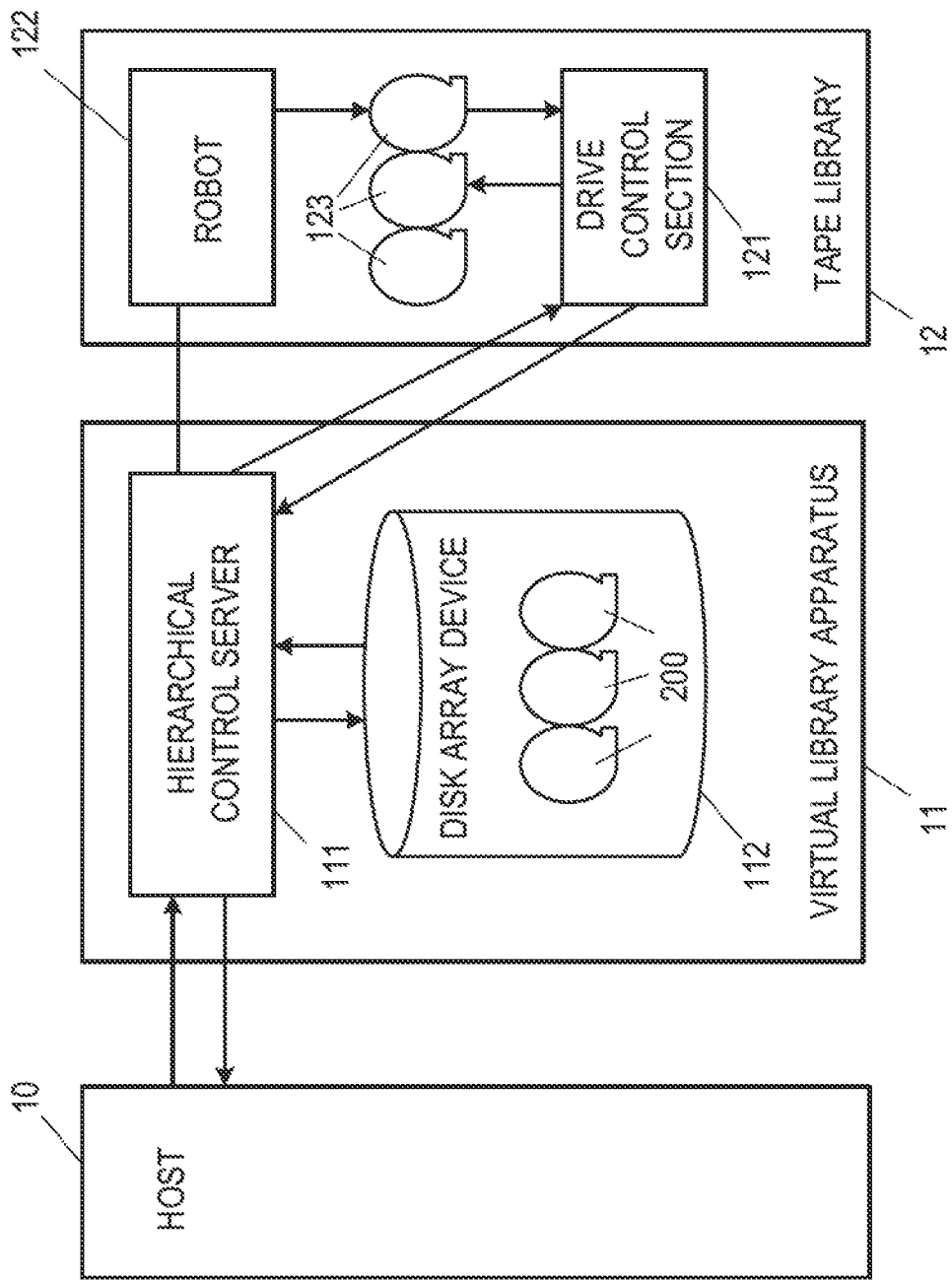
FIG. 7 illustrates an exemplary configuration of a virtual library apparatus of a related art.

FIG. 5 and FIG. 6 illustrate an example of an operation process flow of the hierarchical control server. At S11 in FIG. 5, the physical drive exclusive control section 22 in the hierarchical control server 2 detects that an error has occurred in a physical drive 4 and notifies the host 1 that the error has occurred in the physical drive 4 (at S11). The logical drive exclusive control section 21 in the hierarchical control server 2 receives from the host 1 an instruction to reserve a logical drive (at S12), and exclusively secures the logical drive 30 (at S13). Next, the physical drive exclusive control section 22 receives from the host 1 an instruction to reserve the physical drive (at S14), and exclusively secures the physical drive 4 (at S15). Next, the mount/dismount section 25 mounts a medium for diagnosis to the physical drive 4 exclusively secured at S15 (at S16). Subsequently, the diagnostic section 23 performs a diagnostic process on the physical drive 4 exclusively secured at S15 above through the logical drive 30 exclusively secured at S13 above (at S17).

Next, at S18 in FIG. 6, the diagnostic section 23 determines whether an abnormality has occurred in the physical drive 4 (at S18). When the diagnostic section 23 determines that no abnormality has occurred in the physical drive 4, the diagnostic section 23 notifies the host 1 of the completion of the diagnostic process (at S19). The logical drive exclusive control section 21 and the physical drive exclusive control section 22 then receive from the host 1 instructions to release the logical drive and the physical drive, and release the logical drive 30 and the physical drive 4, respectively (at S20). At S18 above, when the diagnostic section 23 determines that an abnormality has occurred in a physical drive 4, the physical drive exclusive control section 22 refers to the history information in the history information storage section 27 and identifies a new physical drive 4 that used a medium immediately before the physical drive 4, the subject of this diagnostic process, used the medium at the time of the occurrence of the error detected at S11 in FIG. 5. The physical drive exclusive control 22 then exclusively secures the identified physical drive 4 (at S21), and the process returns to S16 in FIG. 5.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

The invention claimed is:

1. A virtual library apparatus comprising:
   an exclusive control section to exclusively secure a logical drive and a physical drive according to an instruction from a host at a time of an occurrence of an error in the physical drive; and
   a diagnostic section to perform a diagnosis on the exclusively secured physical drive through the exclusively secured logical drive, wherein
   the exclusive control section is to release the exclusively secured logical and physical drives after the diagnostic section completes the diagnostic process for the physical drive, and
   the diagnostic section determines whether an abnormality is detected in the physical drive by the diagnosis, and when the diagnostic section determines that the abnormality is detected in the physical drive, the exclusive control section exclusively secures a prior physical drive that used a medium immediately before the physical drive used the medium at the time of the occurrence of the error, and
   the diagnostic section performs a diagnosis on the exclusively-secured prior physical drive.

2. The virtual library apparatus according to claim 1, wherein
   the exclusive control section sets a flag in a management table to indicate that the logical drive is exclusively secured.

3. The virtual library apparatus according to claim 1, wherein
   the exclusive control section resets a flag in a management table that was previously set to indicate that the logical drive is exclusively secured.

4. The virtual library apparatus according to claim 1, further comprising
   a mount/dismount section that, when a physical drive to be exclusively secured is in use, dismounts a medium loaded into the physical drive in use from the physical drive and mounts a medium for use in the diagnosis to the physical drive.

5. A method for diagnosing a physical drive in a virtual library apparatus, comprising:
   exclusively securing a logical drive and the physical drive according to an instruction from a host issued at a time of an occurrence of an error in the physical drive;
   performing a diagnostic process on the exclusively secured physical drive through the exclusively secured logical drive;
   releasing the exclusively secured logical and physical drives after completion of the diagnostic process for the physical drive;
   determining whether an abnormality is detected in the physical drive; and
   when the virtual library apparatus determines that the abnormality is detected in the physical drive,
   exclusively securing a prior physical drive that used a medium immediately before the physical drive used the medium at the time of the occurrence of the error, and
   performing a diagnostic process on the exclusively secured prior physical drive.

6. The method for diagnosing a physical drive according to claim 5, further comprising:
   setting a flag in a management table to indicate that the logical drive is exclusively secured.

7. The method for diagnosing a physical drive according to claim 5, further comprising:
   resetting a flag in a management table that was previously set to indicate that the logical drive is exclusively secured.

8. The method for diagnosing a physical drive according to claim 5, further comprising:
   when a physical drive to be exclusively secured is in use, dismounting a medium loaded into the physical drive in use from the physical drive and mounting a medium for use in the diagnostic process to the physical drive.

* * * * *